United States Patent
Madugundu (10) Patent No.: US 10,223,473 B2
(45) Date of Patent: Mar. 5, 2019

(54) DISTRIBUTION OF METADATA FOR IMPORTATION

(71) Applicant: International Business Machines Corporation, Armonk, NY (US)

(72) Inventor: Satya Vara Prasad S. Madugundu, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 14/673,940

(22) Filed: Mar. 31, 2015

(65) Prior Publication Data

US 2016/0292301 A1     Oct. 6, 2016

(51) Int. Cl.
*G06F 17/30* (2006.01)

(52) U.S. Cl.
CPC .. *G06F 17/30958* (2013.01); *G06F 17/30525* (2013.01)

(58) Field of Classification Search
CPC ......... G06F 17/30525; G06F 17/30958; G06F 17/30115; G06F 17/30268; G06F 17/30601; G06F 17/3056; G06F 17/30575; G06F 17/30861; G06F 17/30112; G06F 17/30651; G06F 17/30554; G06F 17/30941
USPC ........................................................ 707/798
See application file for complete search history.

(56) References Cited

U.S. PATENT DOCUMENTS

| | | | |
|---|---|---|---|
| 5,986,667 A * | 11/1999 | Jevans | G06T 15/005 345/1.1 |
| 6,993,529 B1 | 1/2006 | Basko et al. | |
| 7,665,064 B2 * | 2/2010 | Able | G06F 17/30861 717/117 |
| 8,140,573 B2 | 3/2012 | McKay et al. | |
| 8,548,938 B2 | 1/2013 | Amaru et al. | |
| 2006/0047855 A1 | 3/2006 | Gurevich et al. | |
| 2006/0212833 A1 * | 9/2006 | Gallagher | G06T 11/206 715/848 |
| 2007/0217676 A1 * | 9/2007 | Grauman | G06K 9/4671 382/170 |
| 2009/0024590 A1 * | 1/2009 | Sturge | G06F 17/30893 |
| 2009/0327377 A1 | 12/2009 | Ylonen | |
| 2010/0131573 A1 * | 5/2010 | Reese | G06F 3/0481 707/812 |
| 2011/0191304 A1 * | 8/2011 | Ristow | G06F 17/30 707/690 |

(Continued)

OTHER PUBLICATIONS

Bui, Hoang, et al.; "ROARS: A Scaleble Repository for Data Intensive Scientific Computing"; University of Notre Dame; pp. 766-775; Jun. 20-25, 2010; Chicago, IL; HPDC '10; Copyright 2010.

*Primary Examiner* — Evan Aspinwall (74) *Attorney, Agent, or Firm* — Tihon Poltavets (57) ABSTRACT

A computer-implemented method for importing portions of an object metadata graph. In an embodiment, the method includes receiving an object metadata graph to store in a metadata repository. The method identifying two portions of the object metadata graph. The method creating a first linkage point between two portions of the object metadata, wherein the first linkage point represents a first portion of the object metadata graph referencing a second portion of the object metadata graph. The method sending the first portion and the second portion of the object metadata graph to the metadata repository based at least on the first linkage point.

12 Claims, 4 Drawing Sheets

(56) References Cited

U.S. PATENT DOCUMENTS

| | | | | |
|---|---|---|---|---|
| 2012/0124478 A1* | 5/2012 | King | ................ | G06F 17/30943 715/738 |
| 2013/0218899 A1* | 8/2013 | Raghavan | ......... | G06F 17/30958 707/741 |
| 2013/0282710 A1* | 10/2013 | Raghavan | ......... | G06F 17/30554 707/728 |
| 2014/0207802 A1 | 7/2014 | Raghavan et al. | | |

\* cited by examiner

DISTRIBUTION OF METADATA FOR IMPORTATION

BACKGROUND

The present invention relates generally to metadata and more particularly to importing portions of metadata into a repository.

Typically, importing a metadata graph in one import would present an out of memory error due to the metadata graph being too large to load into a repository in a single execution. When importing metadata of a database or database schema into a repository, metadata can include tables, columns, and stored procedures, along with references between all the information. Loading the complete database or database schema into the repository does not allow for scalability. As a result, splitting the metadata into smaller portions and importing each portion of metadata individually avoids any out of memory errors. However, splitting the metadata into smaller portion results in a creation of multiple link points (i.e., a temporary representation of missing references between objects) in the metadata repository during the import process. As a result, the greater the number of link points results in a greater duration for importing the number of portions of metadata into the metadata repository.

SUMMARY

Embodiments of the present invention disclose a method, computer program product and computer system for importing portions of an object metadata graph. A computer-implemented method includes receiving, by one or more processors, an object metadata graph to store in a metadata repository. The method identifies two portions of the object metadata graph. The method creates a first linkage point between two portions of the object metadata, wherein the first linkage point represents a first portion of the object metadata graph referencing a second portion of the object metadata graph. The method sends, by one or more processors, the first portion and the second portion of the object metadata graph to the metadata repository based at least on the first linkage point.

DETAILED DESCRIPTION

Embodiments in accordance with the present invention provide a mechanism to split an object metadata graph into portions of metadata that optimize importation into a metadata repository. Importing the portions of metadata (i.e., unit object sub-graphs) into the metadata repository is done in a determined order, where there is a reduced amount of linkage points between the portions and a reduced amount of total time for importing the portions of metadata. The determined order and linkage points allow for the portions of metadata to be reconstructed in the metadata repository without errors being produced, and signal that a portion of metadata being referenced does not exist. Scaling each portion of metadata allows for the importation of object metadata graphs, without compromising overall time required for the importation.

Figure 1:
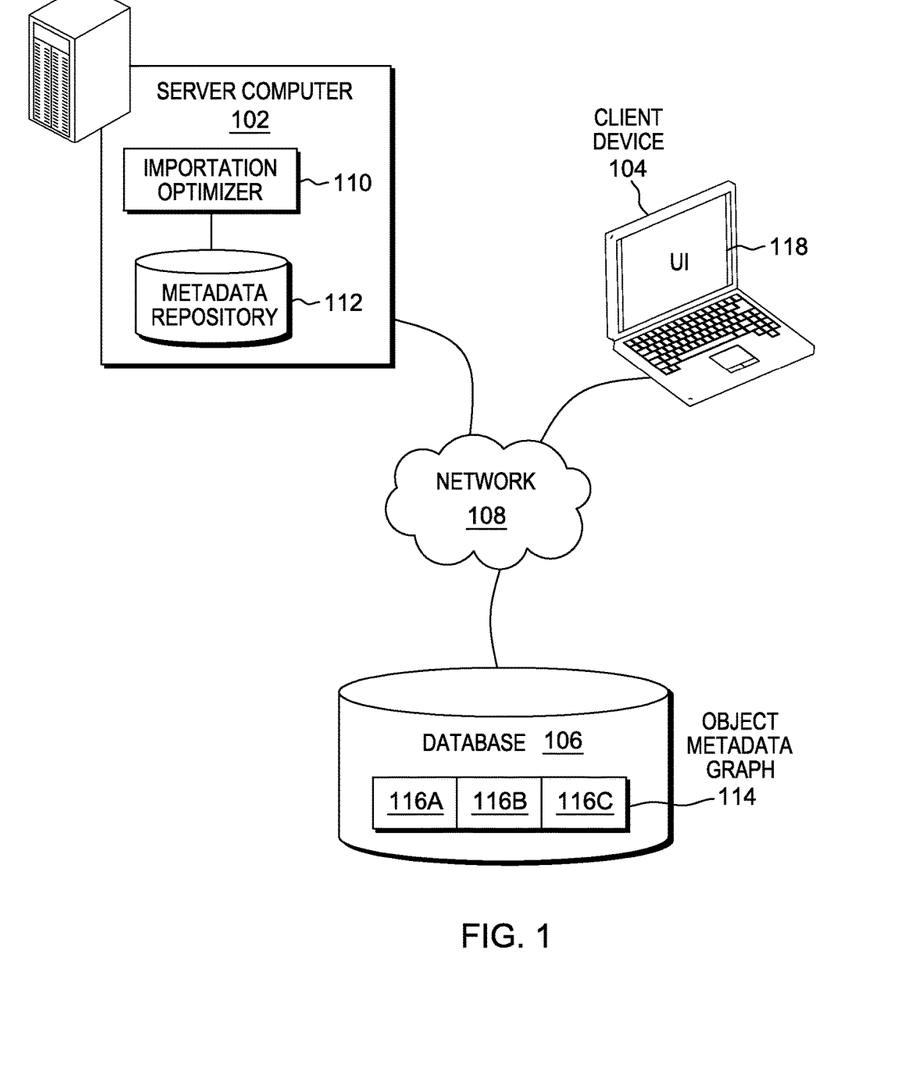
FIG. 1 is a functional block diagram illustrating a distributed data processing environment, in an embodiment in accordance with the present invention.

Example embodiments in accordance with the present invention will now be described in detail with reference to the drawing figures. FIG. 1 is a functional block diagram illustrating a distributed data processing environment. The distributed data processing environment includes server computer 102, client device 104, and database 106 interconnected over network 108.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 108, as is common in data centers and with cloud computing applications. In general, server computer 102 is representative of any programmable electronic device or combination of programmable electronic devices capable of executing machine readable program instructions and communicating with other computer devices via a network. In this embodiment, server computer 102 has the ability to communicate with other computer devices to query the computer devices for information.

In this embodiment, importation optimizer 110 residing in server computer 102 has the ability to receive an object metadata graph, where importation optimizer 110 stores the object metadata graph in metadata repository 112. In another embodiment, importation optimizer 110 has the ability to retrieve metadata from a data source, such as database schema or extensible markup language (XML) data, not illustrated in FIG. 1. Importation optimizer 110 can also retrieve the metadata from an application, where the application can produce analysis results with operational metadata. Importation optimizer 110 can identify unit object sub-graphs representing optimal portions to divide the object metadata graph, such that an out of memory error is avoided. Among the identified unit object sub-graphs, importation optimizer 110 identifies references between each of the unit object sub-graphs. Importation optimizer 110 creates a linkage point for every identified reference between each of the unit object sub-graphs. Based on the created linkage points, importation optimizer 110 sends each unit object sub-graph to metadata repository 112.

Database 106 stores object metadata graph 114, where object metadata graph 114 is being transferred from database 106 to metadata repository 112. In this embodiment, unit object sub-graphs 116A, 116B, and 116C represent the portions into which importation optimizer 110 distributes object metadata graph 114. Linkage points between unit object sub-graphs 116A, 116B, and 116C determine an order in which importation optimizer 110 sends unit object sub-graphs 116A, 116B, and 116C to metadata repository 112 for storage. In this embodiment, metadata repository 112 represents a metadata storage residing in server computer 102. In another embodiment, metadata repository 112 can reside external to server computer 102 and can communicate with importation optimizer 110 via network 108.

Client device 104 may be a desktop computer, a laptop computer, a tablet computer, a specialized computer server, a smart phone, or any programmable electronic device capable of communicating with server computer 102 and database 106 via network 108. In general, client device 104 represents any programmable electronic device or combination of programmable electronic devices capable of executing machine readable program instructions and communicating with other computing devices via a network, such as network 108. Client device 104 includes user interface 118 through which a user of client device 104 can communicate with importation optimizer 110 residing on server computer 102.

User interface 118 provides an interface between a user of client device 104 and importation optimizer 110. User interface 118 may be a graphical user interface (GUI) or a web user interface (WUI) or a command line interface and can display text, documents, web browser windows, user options, application interfaces, and instructions for operation, and includes the information (such as graphic, text, and sound) a program presents to a user and the control sequences the user employs to control the program. User interface 118 may also be mobile application software that provides an interface between a user of client device 104 and importation optimizer. Mobile application software, or an "app", is a computer program designed to run on smart phones, tablet computers and other mobile devices. User interface 118 enables a user of client device 104 to establish administrative parameters for operations that importation optimizer 110 performs.

In general, network 108 can be any combination of connections and protocols that will support communications among server computer 102, client device 104, and database 106. Network 108 can include, for example, a local area network (LAN), a wide area network (WAN), such as the internet, a cellular network, or any combination of the preceding, and can further include wired, wireless, and/or fiber optic connections. In one embodiment, importation optimizer 110 can be a web service accessible via network 108 to a user of client device 104. In another embodiment, importation optimizer 110 may be operated directly by a user of server computer 102.

Figure 2:
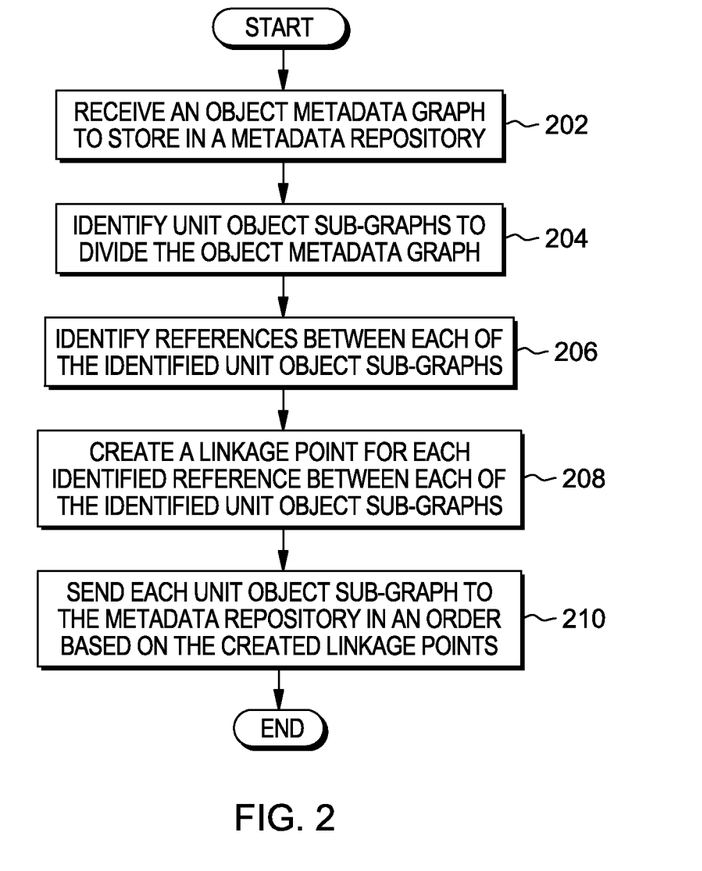
FIG. 2 is a flowchart depicting one embodiment of an importation method for managing object metadata graph importation into a metadata repository, in accordance with the present invention.

FIG. 2 is a flowchart depicting one embodiment of an importation method for managing object metadata graph importation into a metadata repository, in accordance with the present invention. As depicted, the importation optimizer method includes receiving (202) an object metadata graph to store in a metadata repository, identifying (204) unit object sub-graphs to divide the object metadata graph, identifying (206) references between each identified unit object sub-graph, creating (208) a linkage point for each identified reference, and sending (210) each unit object sub-graph to the metadata repository in an order based on the created linkage points. In one embodiment, the importation method is conducted by importation optimizer 110.

The method may commence by receiving (202) an object metadata graph to store in a metadata repository. In this embodiment, importation optimizer 110 receives an object metadata graph, where storing the object metadata graph is performed in portions. An object metadata graph is metadata representing properties of an object graph. The object graph is a set of related objects representing a view of an object system at a particular point in time. In an example, child A represents a first object and parent A represents a second object. The first object can reference the second object, as well as, the second object can reference the first object to establish a relationship. As a result, any data entered for the first object has a direct correlation with the second object and vice versa. Storing the object metadata graph as a whole, results in an importation failure due to deficiency in memory for the importation. Each portion is known as a unit object sub-graph, where the unit object sub-graphs form the object metadata graph.

The method may continue by identifying (204) unit object sub-graphs to divide the object metadata graph. In this embodiment, importation optimizer 110 prepares the division of the object metadata graph into unit object sub-graphs by identifying an optimal portion size of a single unit object sub-graph that can avoid an out of memory error from metadata repository 112. The optimal portion size is based on a memory cache capacity of metadata repository 112, where the memory cache capacity is equal to the maximum size of a unit object sub-graph that won't produce an out of memory error. In one example, importation optimizer 110 identifies a database table with columns, indexes, and keys as an optimal portion size of a single unit object sub-graph because the portion size is not expected to produce an out of memory error notification. However, a database schema with tables and stored procedures, may fail to import to the metadata repository due to a greater portion size relative to the optimal portion size of the database table with columns, indexes, and keys.

The method may continue by identifying (206) references between each of the identified unit object sub-graphs. In this embodiment, importation optimizer 110 identifies references between the unit object sub-graphs in order to merge the unit object sub-graphs into the object metadata graph subsequent to importation optimizer 110 importation into metadata repository 112. Continuing from the previous example, if foreign key relationships exist between database tables of the unit object sub-graphs, importation optimizer 110 has to merge the primary tables and referenced tables.

The method may continue by creating (208) a linkage point for each identified reference between each of the identified unit object sub-graph. In this embodiment, importation optimizer 110 creates a linkage point between two identified unit object sub-graphs, where the linkage point represents a reference to a missing object in a chuck that contains partial metadata. In one example, importation optimizer 110 identifies a unidirectional reference from unit object sub-graph A to unit object sub-graph B. Since importation optimizer 110 exports unit object sub-graph A and unit object unit sub-graph B separately, unit object sub-graph A includes the reference to unit object sub-graph B as the linkage point. The unit object sub-graph A is known as a source object, since the reference originates from the unit object sub-graph A. The unit object sub-graph B is known as a target object, since unit object sub-graph B is a target of a reference from unit object sub-graph A.

The method may continue by sending (210) each unit object sub-graph to the metadata repository in an order based on the created linkage points. In this embodiment, importation optimizer 110 sends each unit object sub-graph to the metadata repository, such that importation optimizer 110 does not create linkage points in the metadata repository between each of the unit object sub-graphs. Continuing from the previous example, in the event importation optimizer 110 sends unit object sub-graph B prior to sending unit object sub-graph A, importation optimizer 110 does not store the linkage point of unit object sub-graph A referencing unit object sub-graph B. Sending each unit object sub-graph to the metadata repository based on the created linkage points, eliminates the need to temporarily store the linkage points in the metadata repository.

In another embodiment, importation optimizer 110 sends a first unit object sub-graph with a linkage point to a metadata repository, prior to sending the second object sub-graph. Continuing from the previous example, in the event importation optimizer 110 sends unit object sub-graph A prior to sending unit object sub-graph B to the metadata repository, unit object sub-graph graph A along with the linkage point is stored in the metadata repository. Subsequent to importation optimizer 110 sending unit object sub-graph B to the metadata repository, importation optimizer 110 converts the linkage point between unit object sub-graph A and unit object sub-graph B to a reference as part of the merging process of the unit object sub-graphs in the metadata repository. Importation optimizer 110 deletes the linkage point information from metadata repository since the reference between unit object sub-graph A and unit object sub-graph B is established in metadata repository.

Figure 3A:
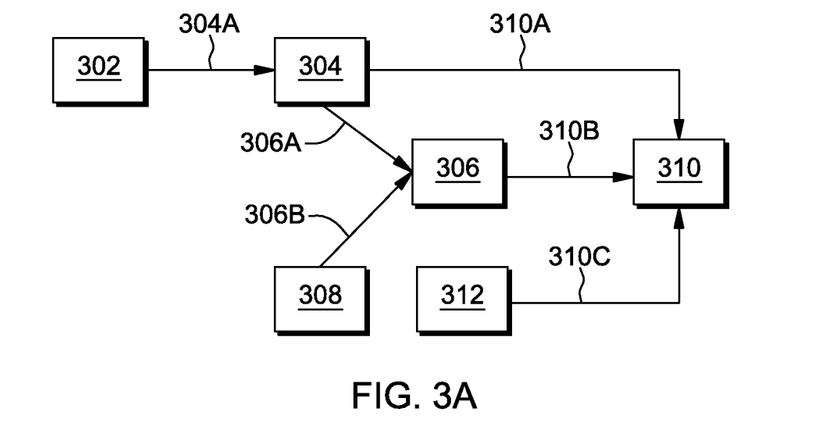
FIG. 3A is a first example scenario for managing object metadata graph importation into a metadata repository, in accordance with an embodiment of the present invention.

FIG. 3A is a first example scenario for managing object metadata graph importation into a metadata repository, in accordance with an embodiment of the present invention.

In this embodiment, an object metadata graph includes hierarchical non-circular references, with a set of leaf elements that are not sources of any references. For instances where unit object sub-graphs in the object metadata graph do not include non-circular references, importation optimizer 110 imports the leaf unit object sub-graphs that are non-source objects first. Non-source objects can include unit object sub-graphs that are either target objects or neither source object nor target object. Importation optimizer 110 identifies the unit object sub-graphs that include direct references to the first imported unit object sub-graph. As a result, importation optimizer 110 imports the first unit object sub-graph, followed by any unit object sub-graphs identified as being referenced to the first unit object sub-graph.

This example includes unit object sub-graphs 302, 304, 306, 308, 310, and 312. The leaf element of the object metadata graph is unit object sub-graph 310. Linkage point 304A represents a reference from unit object sub-graph 302 to unit object sub-graph 304. Linkage point 306A represents a reference from unit object sub-graph 304 and linkage point 306B represents a reference from unit object sub-graph 308 to unit object sub-graph 306. Linkage point 310A represents a reference from unit object sub-graph 304, linkage point 310B represents a reference from unit object sub-graph 306, and linkage point 310C represents a reference from unit object sub-graph 312, to unit object sub-graph 310.

Importation optimizer 110 sends unit object sub-graphs 302, 304, 306, 308, 310, and 312 to a metadata repository in an order based on the linkage point 304A, 306A, 306B, 310A, 310B, and 310C. Importation optimizer 110 performs the importation of the object metadata graph in three phases. Importation optimizer 110 imports each unit object sub-graphs based on a descending order of target references for the unit object sub-graphs. The first phase includes the leaf element of unit objects sub-graph 310. The second phase includes unit object sub-graphs 304, 306, and 312. The third phase includes unit object sub-graph 302 and 308. As a result, importation optimizer 110 does not have to temporary store linkage point information in metadata repository.

Figure 3B:
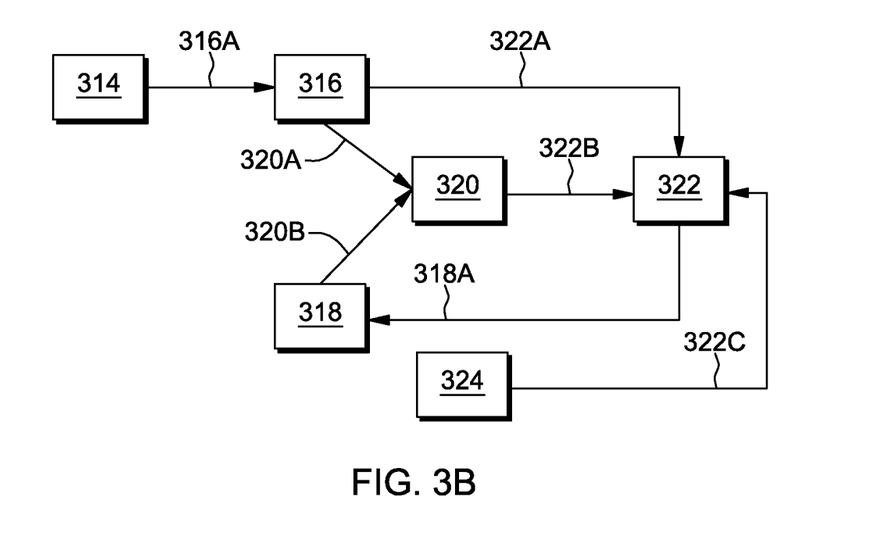
FIG. 3B is a second example scenario for managing object metadata graph importation into a metadata repository, in accordance with an embodiment of the present invention.

FIG. 3B is a second example scenario for managing object metadata graph importation into a metadata repository, in accordance with an embodiment of the present invention.

In this embodiment, an object metadata graph includes circular references, where importation optimizer 110 reduces the number of temporary stored linkage points in a metadata repository. For example, there are 100 references within an object metadata graph with 100 source unit object sub-graphs and 100 target unit object sub-graphs. Importation optimizer 110 includes importing the 100 target unit object sub-graphs prior to importing the 100 source unit object sub-graphs. Inversely, importation optimizer 110 can include importing the 100 source unit object sub-graphs and 100 linkage points (i.e., references) prior to importing the 100 target unit object sub-graphs. As a result, if the object metadata graph includes circular references, importation optimizer 110 imports the target unit object sub-graphs with the highest number of linkage points (i.e., references) to source unit object sub-graphs, in a descending order.

For each unit object sub-graph in the object metadata graph, importation optimizer 110 identifies a number of total references (i.e., linkage points) directed towards the unit object sub-graph. Importation optimizer 110 sorts the unit object sub-graphs by the number of total references in descending order and imports each of the unit object sub-graphs in the descending order. This example includes unit object sub-graphs 314, 316, 318, 320, 322, and 324. Unit object sub-graph 322 is a target unit object sub-graph and includes 3 references; linkage point 322A, 322B, and 322C. Unit object sub-graph 320 is a target unit object sub-graph and includes 2 references; linkage point 320A and 320B. Unit object sub-graph 316 is a target unit object sub-graph and includes 1 reference, linkage point 316A. Unit object sub-graph 318 is a target unit object sub-graph and includes 1 reference, linkage point 318A. Unit object sub-graphs 314 and 324 are not target unit object sub-graphs and as result, include zero references.

Importation optimizer 110 imports the unit object sub-graphs in four phases. The first phase includes the unit object sub-graph with the highest amount of references (3 references), unit objects sub-graph 322. The second phase includes object sub-graph 320, with 2 references. The third phase includes unit object sub-graph 316 and 318, each with 1 reference. The fourth phase includes the source object sub-graphs with no references, unit object sub-graph 314 and 324.

In another embodiment, unit object sub-graphs in an object metadata graph includes multiple circular and non-circular references. Importation optimizer 110 imports the unit object sub-graphs based on reference frequency and recursive grouping based on the reference frequency. Importation optimizer 110 identifies the most frequent references between unit object sub-graphs in the object metadata graph. Importation optimizer 110 groups the unit object sub-graphs based on the most frequent reference as defined by the previous embodiments. If the group is too large for importing all at once, then importation optimizer 110 sub-groups based on the next frequent reference.

Figure 4:
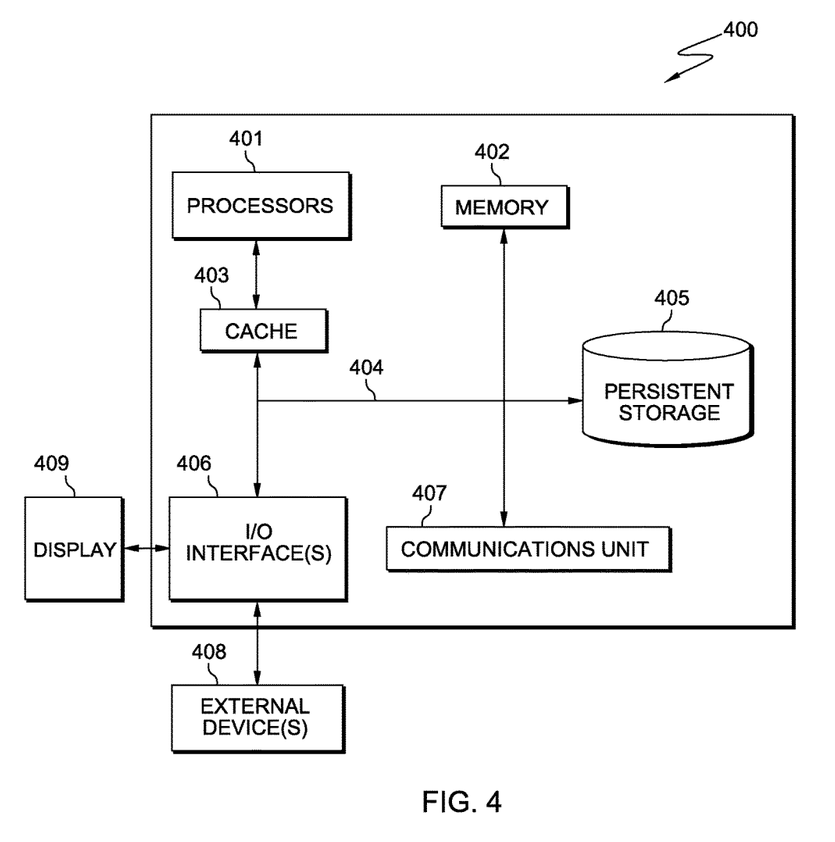
FIG. 4 is a block diagram of components of a computer system, such as the computer server of FIG. 1, in an embodiment in accordance with the present invention.

FIG. 4 depicts computer system 400, where server computer 102 is an example of a system that includes importation optimizer 110. The computer system includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for importing portions of an object metadata graph, the method comprising:

receiving, by a processor of a computing device, an object metadata graph to store in a metadata repository;

preparing, by the processor of the computing device, a division of the object metadata graph into a plurality of portions for importing into the metadata repository, wherein preparing the division of the object metadata graph is based on a portion size for each of the plurality of portions to avoid an out of memory error from the metadata repository;

identifying, by the processor of the computing device, a first reference for a first object metadata portion of the object metadata graph referencing a second object metadata portion of the object metadata graph;

identifying, by the processor of the computing device, a second reference for the second object metadata portion referencing the first object metadata portion, wherein the first reference and the second reference form a circular reference;

identifying, by the processor of the computing device, a third reference for a third object metadata portion of the object metadata graph referencing the first object metadata portion, wherein the third reference is a non-circular reference;

creating, by the processor of the computing device, a plurality of linkage points for each of the first reference, the second reference, and a third reference, wherein the first object metadata portion has at least two linkage points and the second object metadata potion has at least one linkage point;

determining, by the processor of the computing device, an order to send the first object metadata portion, the second object metadata portion, and the third object metadata portion to the metadata repository, wherein the order is based on a descending amount of linkages points between the plurality of portions; and sending, by the processor of the computing device, to the metadata repository, the first object metadata portion, the second object metadata portion, and the third object metadata portion based on the order, wherein the plurality of linkage points allow for the metadata repository to reconstruct the metadata graph from the first object metadata portion, the second object metadata portion, and the third object metadata portion to avoid the out of memory error and to avoid a signal that the first object metadata portion for the third reference does not exist.

2. The method of claim 1, wherein sending to the metadata repository, the first object metadata portion, the second object metadata portion, and the third object metadata portion, further comprises:

sending, by one or more processors, the third object metadata portion of the object metadata graph to the metadata repository, wherein the third object metadata portion is not a source reference; and subsequent to sending the third object metadata portion, sending, by one or more processors, the first object metadata portion and the second object metadata portion of the object metadata graph to the metadata repository.

3. The method of claim 1, wherein sending to the metadata repository the first object metadata portion, the second object metadata portion, and the third object metadata portion, further comprises:

sending, by one or more processors, the first object metadata portion of the object metadata graph to the metadata repository; and subsequent to sending the first object metadata portion, sending, by one or more processors, the second object metadata portion and the third object metadata portion of the object metadata graph to the metadata repository.

4. The method of claim 3, wherein sending the second object metadata portion, and the third object metadata portion, further comprises:

sending, by one or more processors, the second object metadata portion of the object metadata graph to the metadata repository; and subsequent to sending the second object metadata portion, sending, by one or more processors, the third object metadata portion of the object metadata graph to the metadata repository.

5. A computer program product for importing portions of an object metadata graph, the computer program product comprising:
one or more computer readable tangible storage media and program instructions stored on at least one of the one or more storage media, the program instructions comprising:
program instructions to receive an object metadata graph to store in a metadata repository;
program instructions to prepare a division of the object metadata graph into a plurality of portions for importing into the metadata repository, wherein preparing the division of the object metadata graph is based on a portion size for each of the plurality of portions to avoid an out of memory error from the metadata repository;
program instructions to identify a first reference for a first object metadata portion of the object metadata graph referencing a second object metadata portion of the object metadata graph;
program instructions to identify a second reference for the second object metadata portion referencing the first object metadata portion, wherein the first reference and the second reference form a circular reference;
program instructions to identify a third reference for a third object metadata portion of the object metadata graph referencing the first object metadata portion, wherein the third reference is a non-circular reference;
program instructions to create a plurality of linkage points for each of the first reference, the second reference, and a third reference, wherein the first object metadata portion has at least two linkage points and the second object metadata potion has at least one linkage point;
program instructions to determine an order to send the first object metadata portion, the second object metadata portion, and the third object metadata portion to the metadata repository, wherein the order is based on a descending amount of linkages points between the plurality of portions; and
program instructions to send to the metadata repository, the first object metadata portion, the second object metadata portion, and the third object metadata portion based on the order, wherein the plurality of linkage points allow for the metadata repository to reconstruct the metadata graph from the first object metadata portion, the second object metadata portion, and the third object metadata portion to avoid the out of memory error and to avoid a signal that the first object metadata portion for the third reference does not exist.

6. The computer program product of claim 5, wherein program instructions to send to the metadata repository, the first object metadata portion, the second object metadata portion, and the third metadata portion, further comprises program instructions, stored on the one or more computer readable storage media, which when executed by a processor, cause the processor to:
send the third object metadata portion of the object metadata graph to the metadata repository, wherein the third object metadata portion is not a source reference; and
subsequent to sending the third object metadata portion, send the first object metadata portion and the second object metadata portion of the object metadata graph to the metadata repository.

7. The computer program product of claim 5, wherein program instructions to send to the metadata repository, the first object metadata portion, the second object metadata portion, and the third object metadata portion, further comprises program instructions, stored on the one or more computer readable storage media, which when executed by a processor, cause the processor to:
send the first object metadata portion of the object metadata graph to the metadata repository; and
subsequent to sending the first object metadata portion, send the second object metadata portion and the third object metadata portion of the object metadata graph to the metadata repository.

8. The computer program product of claim 7, wherein program instructions to send the first object metadata portion, send the second object metadata portion, and the third object metadata portion, further comprises program instructions, stored on the one or more computer readable storage media, which when executed by a processor, cause the processor to:
send the second object metadata portion of the object metadata graph to the metadata repository; and
subsequent to sending the second object metadata portion, send the third object metadata portion of the object metadata graph to the metadata repository.

9. A computer system for importing portions of an object metadata graph, the computer system comprising:
one or more computer processors;
one or more computer readable storage media; and
program instructions stored on the computer readable storage media for execution by at least one of the one or more computer processors, the program instructions comprising:
program instructions to receive an object metadata graph to store in a metadata repository;
program instructions to prepare a division of the object metadata graph into a plurality of portions for importing into the metadata repository, wherein preparing the division of the object metadata graph is based on a portion size for each of the plurality of portions to avoid an out of memory error from the metadata repository;
program instructions to identify a first reference for a first object metadata portion of the object metadata graph referencing a second object metadata portion of the object metadata graph;
program instructions to identify a second reference for the second object metadata portion referencing the first object metadata portion, wherein the first reference and the second reference form a circular reference;
program instructions to identify a third reference for a third object metadata portion of the object metadata graph referencing the first object metadata portion, wherein the third reference is a non-circular reference;
program instructions to create a plurality of linkage points for each of the first reference, the second reference, and a third reference, wherein the first object metadata portion has at least two linkage points and the second object metadata potion has at least one linkage point;
program instructions to determine an order to send the first object metadata portion, the second object metadata portion, and the third object metadata portion to the metadata repository, wherein the order is based on a descending amount of linkages points between the plurality of portions; and
program instructions to send to the metadata repository, the first object metadata portion, the second object metadata portion, and the third object metadata portion based on the order, wherein the plurality of linkage points allow for the metadata repository to reconstruct the metadata graph from the first object metadata portion, the second object metadata portion, and the third object metadata portion to avoid the out of memory error and to avoid a signal that the first object metadata portion for the third reference does not exist.

10. The computer system of claim 9, wherein program instructions to send to the metadata repository, the first object metadata portion, the second object metadata portion, and the third metadata portion, further comprises program instructions, stored on the one or more computer readable storage media, which when executed by a processor, cause the processor to:

send the third object metadata portion of the object metadata graph to the metadata repository, wherein the third object metadata portion is not a source reference; and subsequent to sending the third object metadata portion, send the first object metadata portion and the second object metadata portion of the object metadata graph to the metadata repository.

11. The computer system of claim 9, wherein program instructions to send to the metadata repository, the first object metadata portion, the second object metadata portion, and the third object metadata portion, further comprises program instructions, stored on the one or more computer readable storage media, which when executed by a processor, cause the processor to:

send the first object metadata portion of the object metadata graph to the metadata repository; and subsequent to sending the first object metadata portion, send the first second object metadata portion and the third object metadata portion of the object metadata graph to the metadata repository.

12. The computer system of claim 11, wherein program instructions to send the first object metadata portion, send the second object metadata portion, and the third object metadata portion, further comprises program instructions, stored on the one or more computer readable storage media, which when executed by a processor, cause the processor to:

send the second object metadata portion of the object metadata graph to the metadata repository; and subsequent to sending the second object metadata portion, send the third object metadata portion of the object metadata graph to the metadata repository.

* * * * *